(12) United States Patent
Hartman (10) Patent No.: US 8,011,503 B2
(45) Date of Patent: Sep. 6, 2011

(54) MODULAR OPTICAL DISC MEDIA STORAGE SYSTEM

(76) Inventor: Erick V. Hartman, Overland Park, KS (US)

( * ) Notice: Subject to any disclaimer, the term of this patent is extended or adjusted under 35 U.S.C. 154(b) by 237 days.

(21) Appl. No.: 12/170,226

(22) Filed: Jul. 9, 2008

(65) Prior Publication Data

US 2010/0006460 A1   Jan. 14, 2010

(51) Int. Cl.
*B65D 85/30* (2006.01)
(52) U.S. Cl. .................... 206/308.1; 206/509; 206/503; 206/232; 211/40; 211/41.12; 211/194
(58) Field of Classification Search ............... 206/308.1, 206/307, 307.1, 509, 503, 312, 387.12, 232; 312/9.45, 9.46, 9.48, 9.58, 9.21; 211/40, 211/41.12, 194
See application file for complete search history.

(56) References Cited

U.S. PATENT DOCUMENTS

| | | | | |
|---|---|---|---|---|
| 4,630,732 A | * | 12/1986 | Snyman | 206/445 |
| 4,998,618 A | * | 3/1991 | Borgions | 206/307 |
| 5,000,316 A | | 3/1991 | Lerner | |
| 5,097,946 A | * | 3/1992 | Emrich | 206/745 |
| 5,147,034 A | * | 9/1992 | Broadhead et al. | 206/1.5 |
| 5,154,291 A | * | 10/1992 | Sur | 206/308.1 |
| 5,191,983 A | * | 3/1993 | Hardy | 211/40 |
| 5,399,004 A | * | 3/1995 | Buschle | 312/9.63 |
| 5,577,620 A | * | 11/1996 | Jacob | 211/40 |
| 5,695,054 A | | 12/1997 | Weisburn et al. | |
| 5,715,948 A | * | 2/1998 | Hung | 211/40 |
| 5,746,325 A | * | 5/1998 | Lee | 211/40 |
| 6,112,910 A | * | 9/2000 | Baxter | 211/40 |
| 6,170,675 B1 | * | 1/2001 | Follman et al. | 211/41.1 |
| 6,188,032 B1 | | 2/2001 | Hartman | |
| 6,991,101 B2 | * | 1/2006 | Bennett | 206/308.1 |
| 2006/0021884 A1 | * | 2/2006 | Castritis | 206/308.1 |
| 2006/0180486 A1 | * | 8/2006 | Bennett | 206/308.1 |

* cited by examiner

*Primary Examiner* — Mickey Yu
*Assistant Examiner* — Jenine M Pagan
(74) *Attorney, Agent, or Firm* — Polsinelli Shughart PC; Marcia J. Rodgers (57) ABSTRACT

Protective modular holders for CDs and DVDs can be assembled into a storage assembly from which each disc and its accompanying literature can be removed without opening an individual holder. Two outer elements and an inner element form a module which receives two components, such as a pair of discs, or a disc and a booklet. Each side of the inner member cooperates with the corresponding outer element to form a disc receiving opening with openings aligned or at 90° or 180° offsets. The units are connected at the corners to adjacent units with the openings in selected alignments to form a storage assembly. The assembly may be expanded by connecting additional holder units. The outer elements and inner members cooperatively form a slot and label rail for receiving a label when the elements are joined together. The inner holder member surfaces may include a disc cleaner.

19 Claims, 12 Drawing Sheets

MODULAR OPTICAL DISC MEDIA STORAGE SYSTEM

BACKGROUND OF THE INVENTION

The present disclosure is broadly concerned with a universal stacking, self-cleaning disc holder with optional CD/DVD booklet assembly. The disc holder is generally a container for storing optical discs such as compact discs (CD), digital video discs (DVD) or the like. More particularly, it is concerned with a stackable modular storage unit for assembly into a composite media holder assembly for organizing and keeping a mixed variety of CDs, DVDs and accompanying printed materials.

CD's are generally used for recorded music or computer software, while DVD'S are generally used for commercial video recordings of performances such as movies, television programs, and home video recordings. Music CD's and DVD's are commonly packaged in a "keep case" in association with a booklet or so-called "liner notes" describing the contents of the disc and information regarding the performers. Game CDs or computer programs are generally packaged with a game or instruction manual and registration card. While paper, cardboard and other forms of packaging may be employed, the most favored form of packaging is the so-called "jewel box", or clear plastic hinged box. Integral plastic tabs hold the booklet in place against the front face of the box, so that the booklet also serves as an artistic cover, and the CD or DVD is snapped onto a resilient hub or "post" that retains it in place within the box. A rear label or index of the contents of the disc may be held in place against the rear face of the box.

The digital data forming the music, software or audio visual recording is impressed on the underside of the disc in the form of pits, which are read by a laser mechanism in a corresponding player. Because the pits are not well protected against scratching or fouling with dirt and oils from the skin, it is advisable to handle the discs by their edges to avoid touching the data-impressed underside.

Conventional jewel boxes provide less than ideal disc storage. They can be cumbersome to open and their hinges are subject to failure. Extraction of the disc from the central post may require substantial manual dexterity. If the disc is tightly snapped onto the post, it may be necessary to depress the post somewhat while grasping the edges of the disc to obtain release of the disc from the post. This is generally a three fingered operation, requiring depression of the post with one finger while both sides of the disc are grasped between two other fingers of the same hand to insure that the disc is not tipped and scratched by the post or the edges of the box during removal. Newer jewel boxes have attempted to address this problem by using a shorter post. However, this provides a less secure connection between the disc and the post and makes the disc liable to fall out if the box is inadvertently opened.

It is desirable to provide storage for the discs adjacent the point of use, such as a CD player, DVD player or computer. Various types of storage units such as racks, shelves, drawers and wallets have been designed for storing collections of discs. Rack units have slots sized to receive a jewel box containing a disc. However, if the unit is not orientationally stable, a tilt of the rack in the wrong direction will allow some of the jewel boxes to slide out. Shelves and drawers are more stable than racks, but tend to be substantially more expensive. Drawers require additional space since they must be opened to permit browsing of the titles of discs stored inside. In addition, because DVD booklets are taller than CDs and in order to avoid wasted space, racks, shelves and drawers are typically sized to receive only one type of disc. Unless a collection is evenly mixed, it may be necessary to purchase more racks, shelves or drawers for one type of disc than is required.

Wallet or album type holders receive only the disc itself, without the case or accompanying literature. This may be desirable for portability, but such units fail to protect the discs against warping. They also do not provide storage space for the accompanying literature, which may be misplaced if separated from the related disc. These units also require additional space so that they may be fully opened to permit browsing of the titles or to remove a single disc.

Conventional racks, shelves, drawers and wallet storage units provide space for a predetermined number of jewel boxes or discs. When the storage space is filled, another unit must be acquired or the collection culled to fit the available units. And neither these storage units nor jewel boxes provide direct access to the stored discs without first opening a drawer, wallet or jewel box. It is also desirable to provide labels that can be viewed without opening the storage unit and extracting the disc.

Accordingly, there is a need for a storage system for discs that protects against warping, is modular and expandable, that is orientationally stable, that can be configured to provide space for storage of accompanying literature of varying sizes adjacent respective discs, that provides for easy, direct extraction of the stored discs and literature without the need for opening an individual storage unit, and that provides for selective configuration to permit optimal access to the discs and literature from any side of each individual storage unit.

SUMMARY OF THE INVENTION

The modular optical disc media storage system provides modular protective holders for recorded media components such as CDs and DVDs which can be assembled into a stable composite media storage assembly from which each disc and its accompanying literature can be easily and directly removed from the outside without the need for removing and opening the individual holders. Each modular unit includes first and second outer elements interconnected by an inner holder element to form a two-chambered modular holder unit. Each outer element is configured to receive a corresponding recorded media component, such as a compact disc, a video disc, a booklet or card. The outer elements of each modular unit may receive similar or dissimilar media components, such as a pair of discs, or a disc and a booklet. The outer elements may also include a stop that is adjustable to accommodate shorter booklets. The inner element cooperates with the outer elements to receive and support the first media component on its first side and the second media component on its second side. The first side of the inner member and the first outer holder element cooperatively form a first opening for receiving a media component and the second side of the inner holder member, and the second outer holder element cooperatively form a second opening for receiving a media component. These openings may be aligned, or they may be positioned in selected angular offset relation of about 90° or about 180°. The modular holder units are connected at the corners to adjacent units to form a storage assembly which may be expanded by connecting additional holder units. The units may be connected with their openings aligned, or they may be connected so that the openings are positioned in selected offset relation of about 90° or about 180°.

One or both of the outer elements and inner holder member cooperatively forms a slot and a label rail for receiving and retaining a label when the elements are joined together. One or both of the inner holder member surfaces may also be equipped with a cleaner surface for cleaning a disc. The modular disc media holder of the present disclosure provides a greatly improved storage system for CDs, DVDs and their accompanying literature that is both flexible and externally accessible.

Various objects and advantages will become apparent from the following description taken in conjunction with the accompanying drawings wherein are set forth, by way of illustration and example, certain embodiments of this invention.

The drawings constitute a part of this specification, include some exemplary embodiments of the numerous embodiments possible, and illustrate various objects and features thereof.

DETAILED DESCRIPTION OF THE INVENTION

As required, detailed embodiments of the modular disc holder are disclosed herein; however, it is to be understood that the disclosed embodiments are merely exemplary of the unit, which may be embodied in various forms. Therefore, specific structural and functional details disclosed herein are not to be interpreted as limiting, but merely as a basis for the claims and as a representative basis for teaching one skilled in the art to variously employ the modular holder unit in virtually any appropriately detailed structure.

Figure 1:
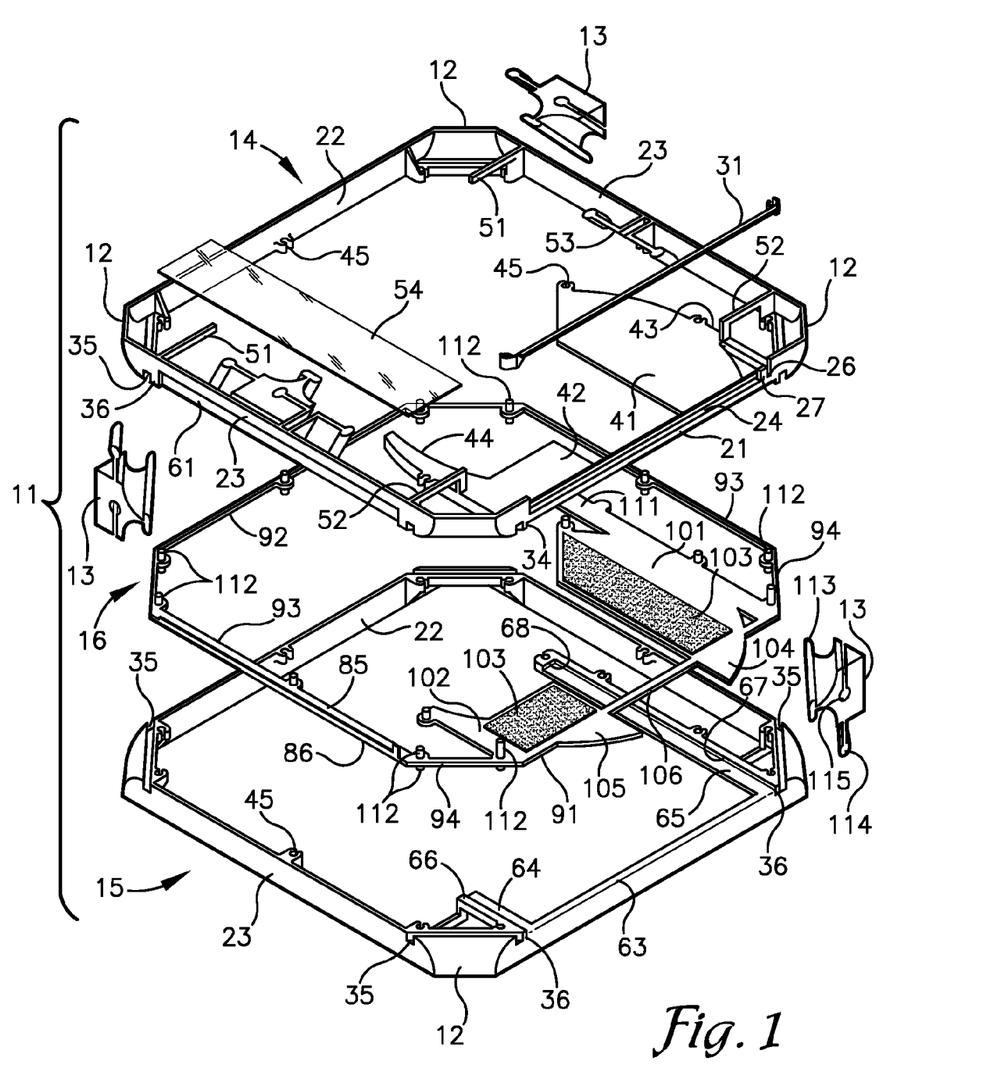
FIG. 1 is an exploded perspective view of an optical disc and printed media holder unit with the disc and printed media entry positioned on the same side of the unit.
Figure 2:
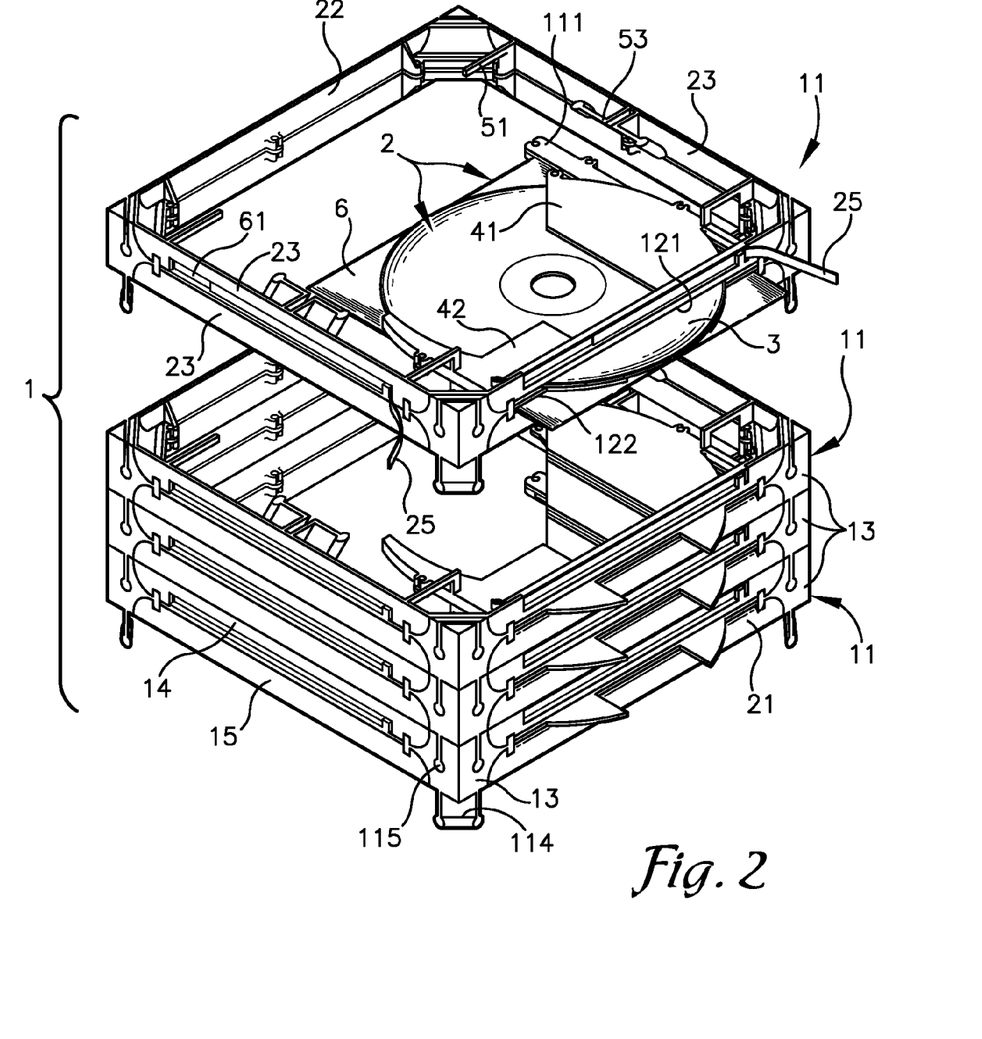
FIG. 2 is a perspective view of an assembly of the optical disc and printed media holder units of FIG. 1 with the units interconnected in alignment.
Figure 3:
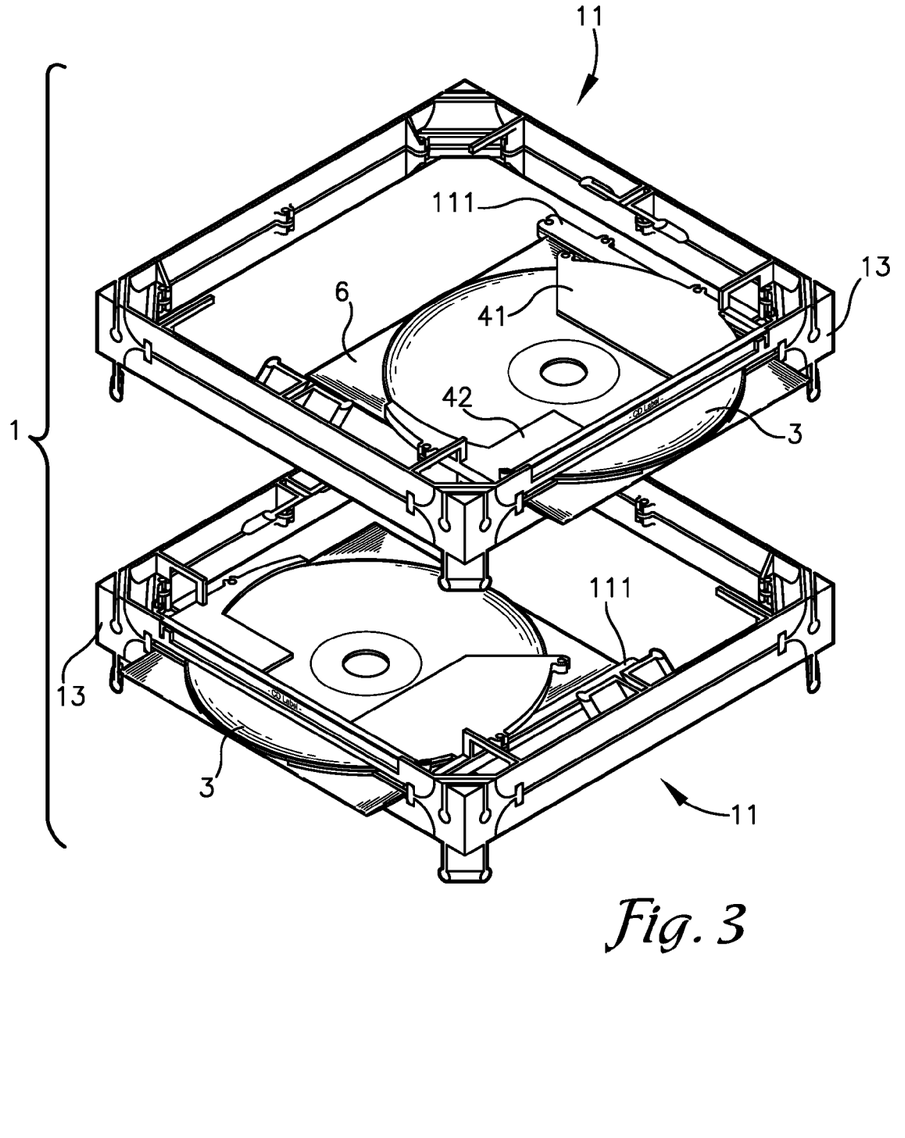
FIG. 3 is a perspective view of an exploded assembly of the optical disc and printed media holder units of FIG. 1 positioned for assembly of the units in 90° offset relation.

Referring now to the drawing figures, the reference numeral 1 refers to a modular storage or holder assembly for recorded media components, which is depicted in FIGS. 1 through 15 in association with various recorded media components 2, such as a disc 3 (FIG. 2), which may be either a CD or DVD or other format of optical media, a generally square CD booklet 4 (FIGS. 4,14), a generally rectangular DVD booklet 5 (FIGS. 9, 13), and other media components or matter content such as a printed inside insert in the form of a booklet, folded promotional leaflet, or card 6 (FIGS. 2, 3). The assembly 1 is formed by a plurality of keeper or holder units 11. While each holder unit 11 has a generally square overall configuration, the corners 12 are chopped to form an unequal sided octagon (FIG. 1). The units 11 are joined to each other at the corners 12 and held together by unit corner connectors 13 which have a generally triangular configuration when installed and viewed from above (FIGS. 2, 15), thus squaring off the holder unit assembly 1.

Figure 4:
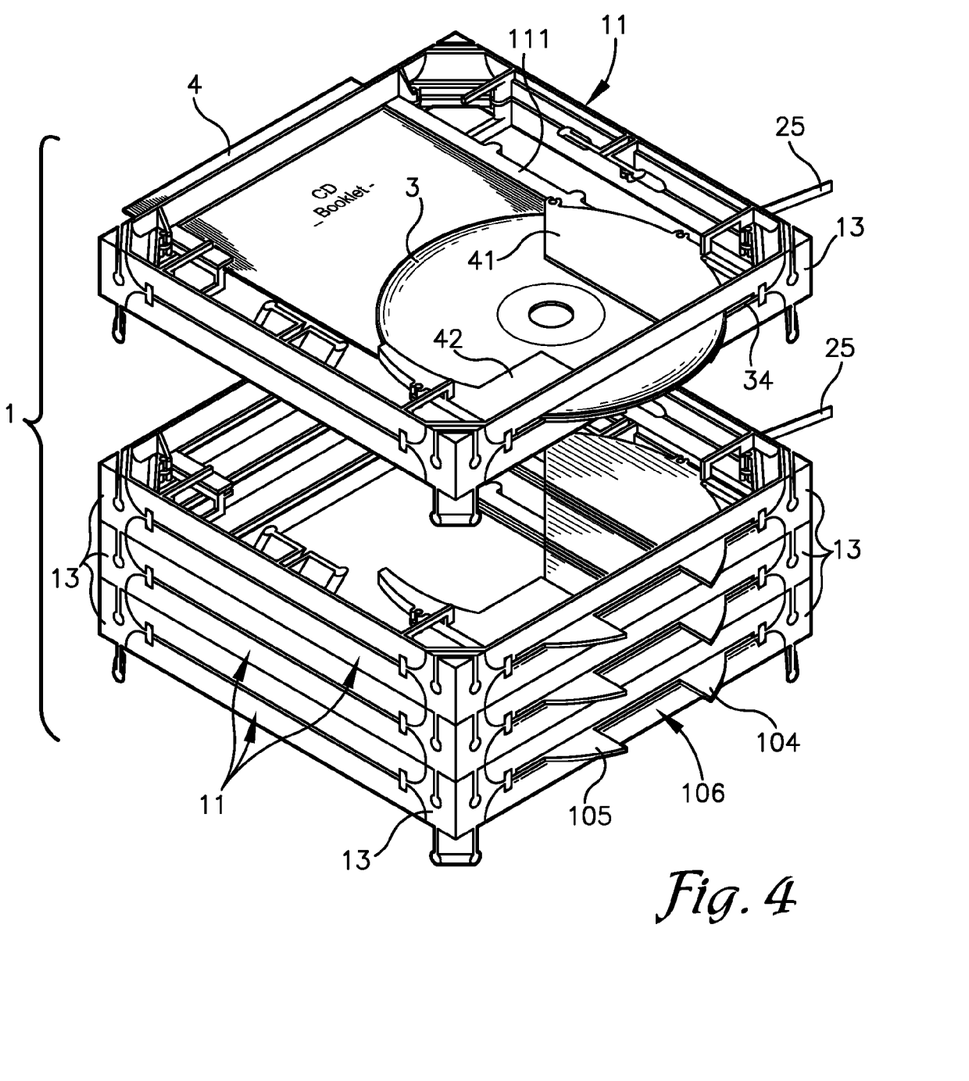
FIG. 4 is a perspective view of an assembly of compact disc and CD booklet holder units, each unit having the disc and booklet entry positioned on opposite sides of each unit, with the units positioned for assembly with all of the units interconnected in alignment.
Figure 5:
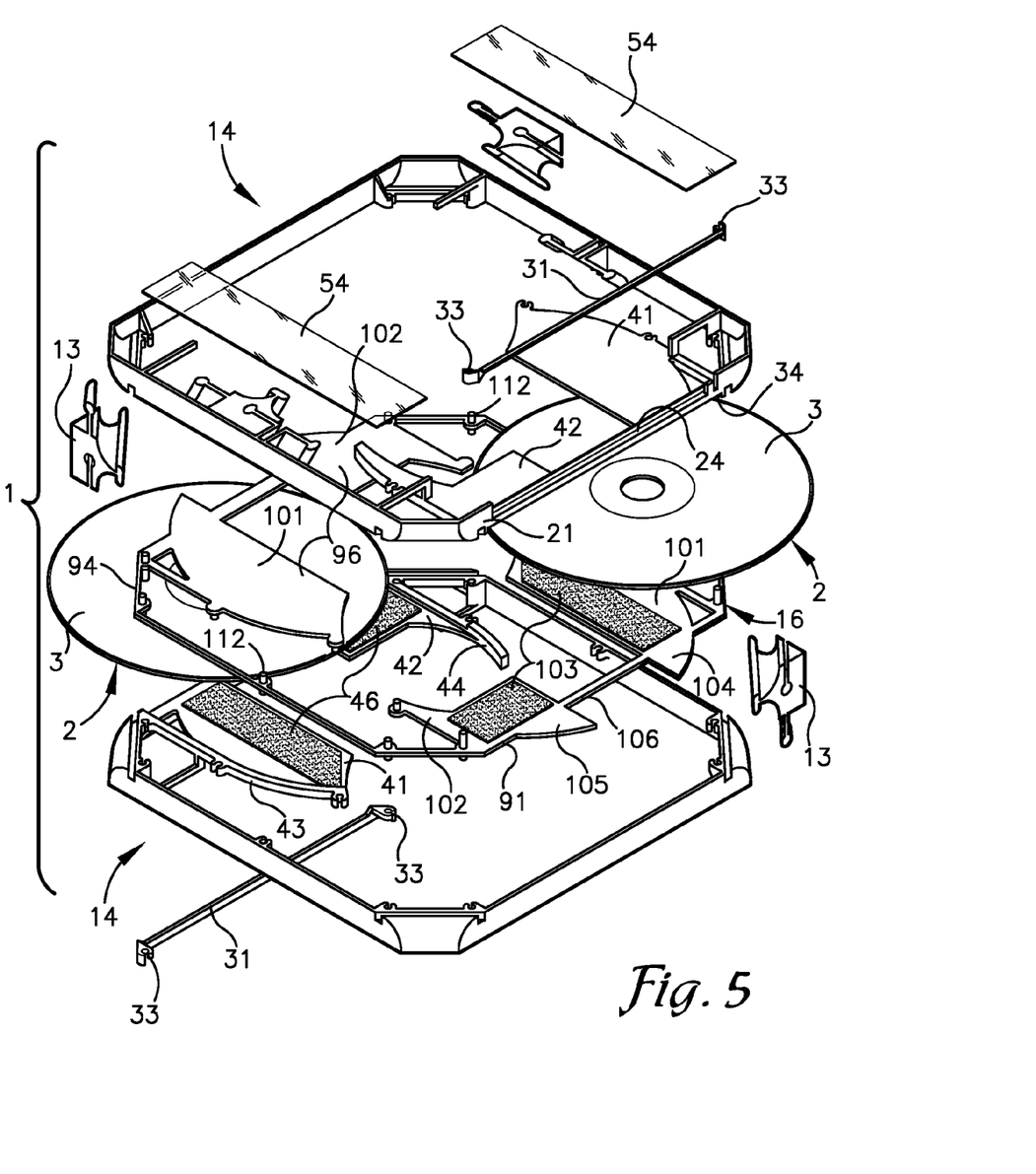
FIG. 5 is an exploded perspective view of a compact disc or digital video disc holder unit for storing two discs with the disc entries positioned on opposed sides of the unit, without printed media retaining structure.
Figure 6:
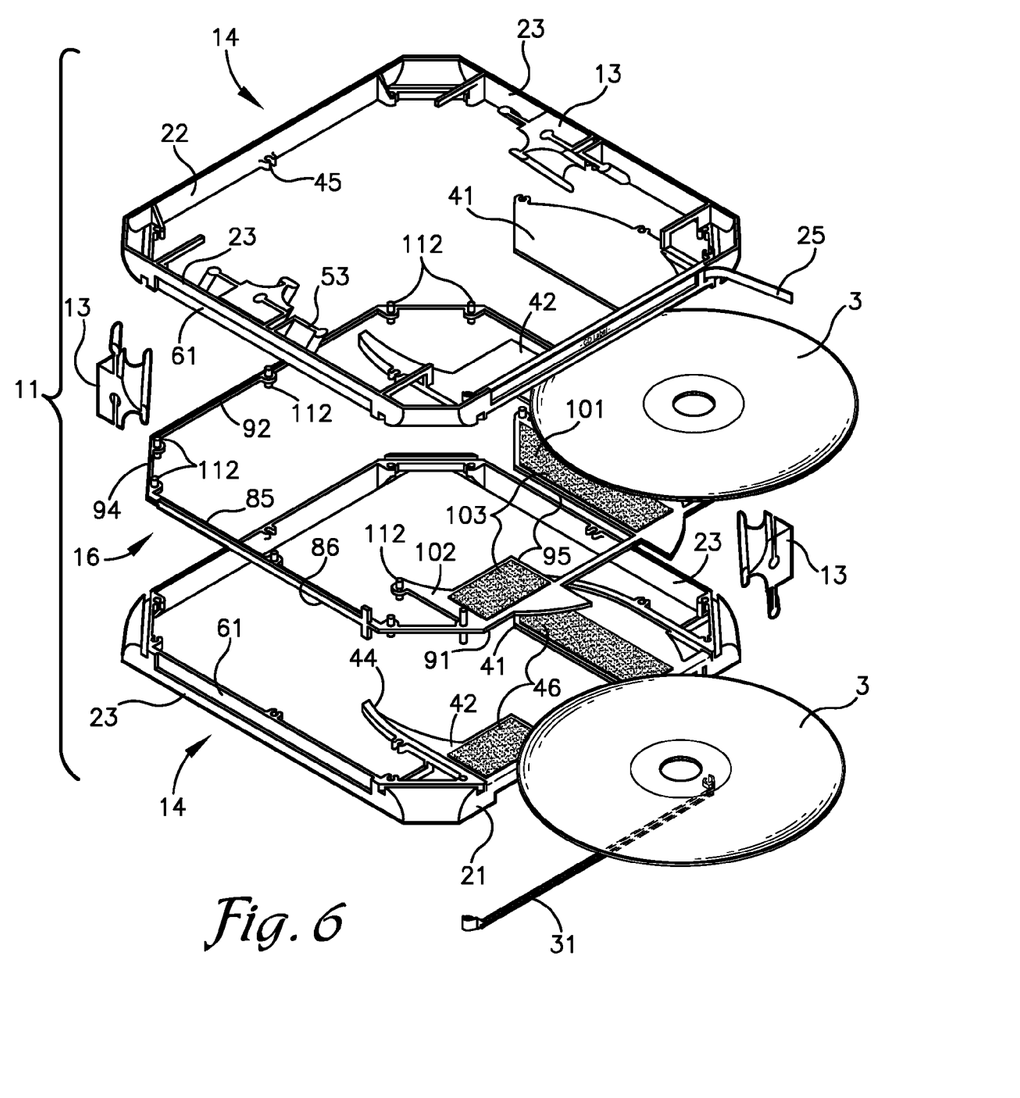
FIG. 6 is an exploded perspective view of a compact disc or digital video disc holder unit for storing two discs with the disc entries positioned on the same side of the unit, without printed media retaining structure.
Figure 9:
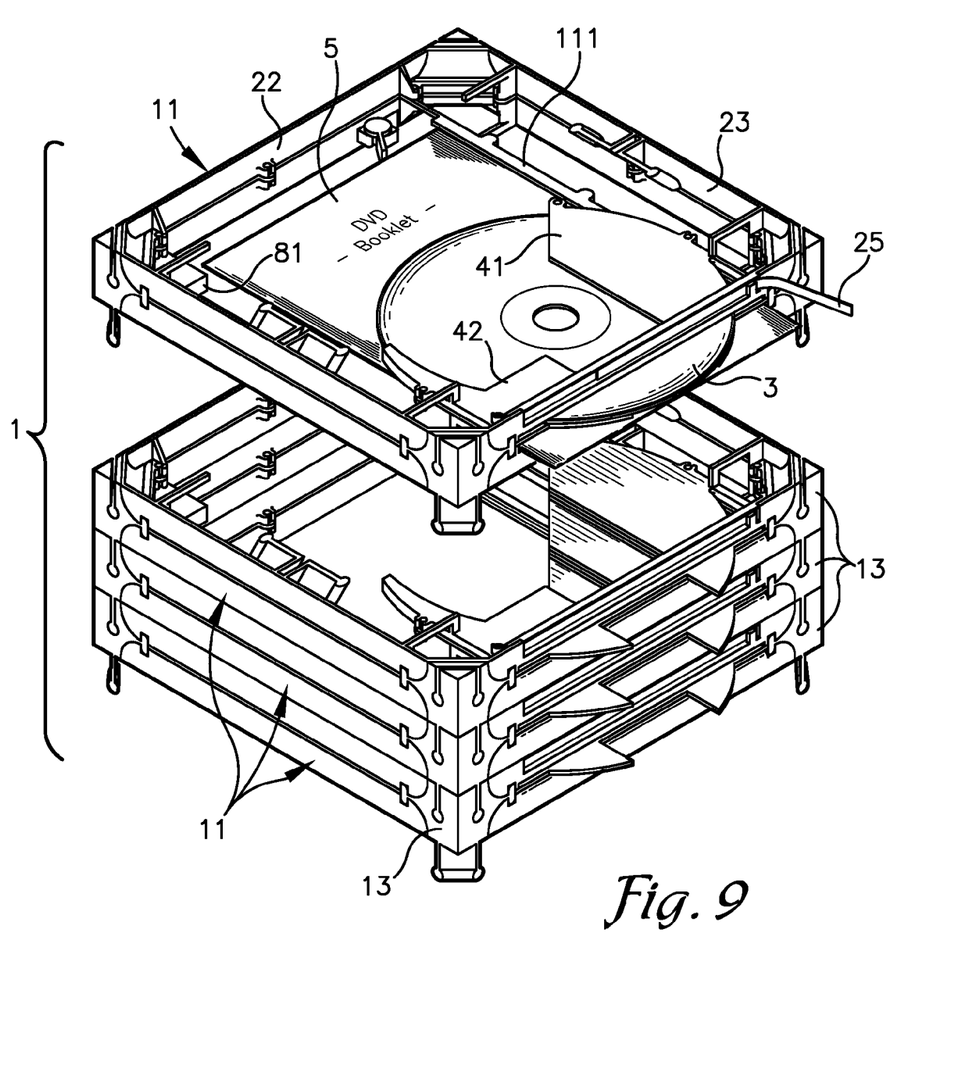
FIG. 9 is a perspective view of an assembly of the digital video disc and booklet holder units of FIG. 7 with the disc and booklet entry of each unit on the same side and with the units positioned for assembly with all of the entries in alignment.
Figures 10, 11, 12:
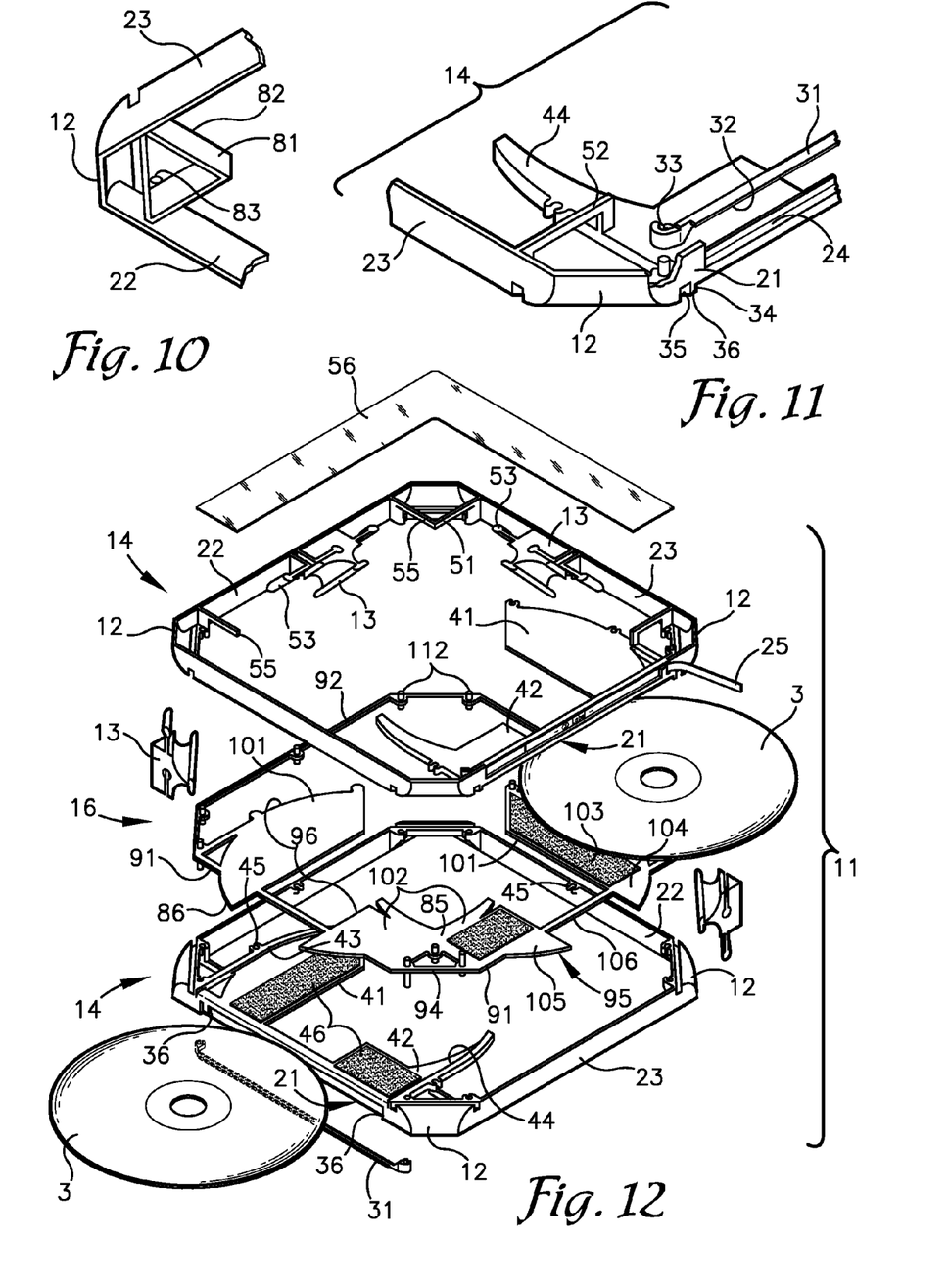
FIG. 10 is an enlarged fragmentary perspective view of a corner of an outer section of a holder unit and showing details of an enclosure for storage of the stop shown in FIGS. 7 and 8.
FIG. 11 is an enlarged fragmentary perspective view of a holder unit and illustrating walls forming a spine label channel and pin and socket members of the unit.
FIG. 12 is an exploded perspective view of a compact disc or digital video disc holder unit for storing two discs with the disc entries positioned in 90° offset relation, without printed media retaining structure.

As best shown in FIGS. 1, 5, 6, 7, 12, and 13, each holder unit 11 includes a first outer holder element 14, a second outer holder element 15 and an inner holder element or member 16. FIGS. 1, 2, 3, 4, 7, 9, 13 and 14 depict an outer holder element 14 configured to receive a disc 3, and an outer holder element 15 configured to receive a booklet such as a CD booklet 4, DVD booklet 5, folder (not shown) or card 6. FIGS. 5, 6 and 12 depict a pair of outer holder elements 14 configured to receive a disc. Those skilled in the art will appreciate that it would also be possible to construct a holder unit 11 using a pair of outer holder elements 15 configured to receive a booklet 4 or 5 or card 6.

Figure 13:
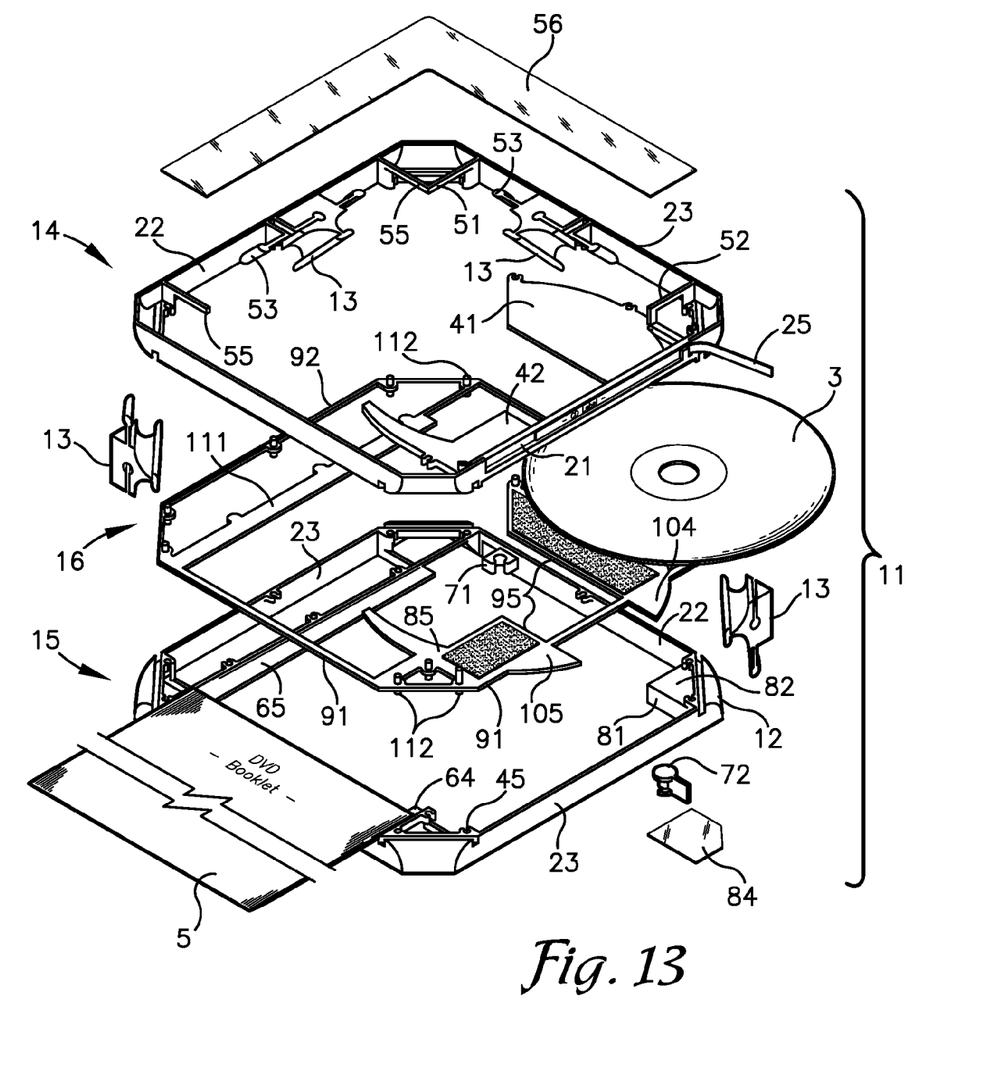
FIG. 13 is an exploded perspective view of a digital video disc and booklet holder unit with the disc and booklet entries positioned in 90° offset relation.

The inner holder element 16 is configured to correspond to the first and second outer holder elements 14 and 15 as well as to their orientation when they are assembled. FIG. 1 depicts an inner element 16 configured to receive a disc 3 and printed element 4,5, or 6 from the same side. FIG. 5 depicts an inner element 16 configured to receive a pair of discs 3 from opposite sides. FIG. 12 depicts an inner element 16 configured to receive a pair of discs 3 in a 90° offset relation. FIG. 13 depicts an inner element 16 configured to receive a disc 3 and printed component 4,5, or 6 in 90° offset relation.

The first and second outer holder elements 14 and 15 and the inner holder element 16 are equipped with a series of holes and pegs, as will be later described, arranged quadrilaterally, in a radially symmetrical pattern. This construction enables the elements 14, 15, and 16 to be rotated with respect to each other to enable storage of discs and printed media in an aligned, 90° or 180° offset relation. The inner element 16 must be configured for a particular combination of discs 3 and printed elements 4, 5, or 6 and for a particular set of orientations or directions in which the disc or element is inserted. In contrast, the outer elements 14 and 15 are configured according to whether they are to be used with a disc 3 or a booklet or other printed element 4, 5, or 6 and can be assembled in any appropriate orientation determined by the particular configuration of inner element 16 used.

While the first and second outer holder elements 14 and 15 are depicted in the drawing figures as upper or top and lower or bottom units, respectively, if the units 11 were depicted in a horizontal orientation, the elements 14 and 15 would be shown as respective left or right outer elements. It is understood that such terms are to be construed in accordance with the generally vertical or horizontal orientation in which the holder units 11 are stacked to form the assembly 1.

As shown in FIG. 1, the first outer holder element 14 has an access wall 21 and an opposite end wall 22 with a pair of side walls 23 connected therebetween by a series of corners 12. The access wall 21 is configured to provide easy access to a disc 3 such as a CD or DVD.

Figure 7:
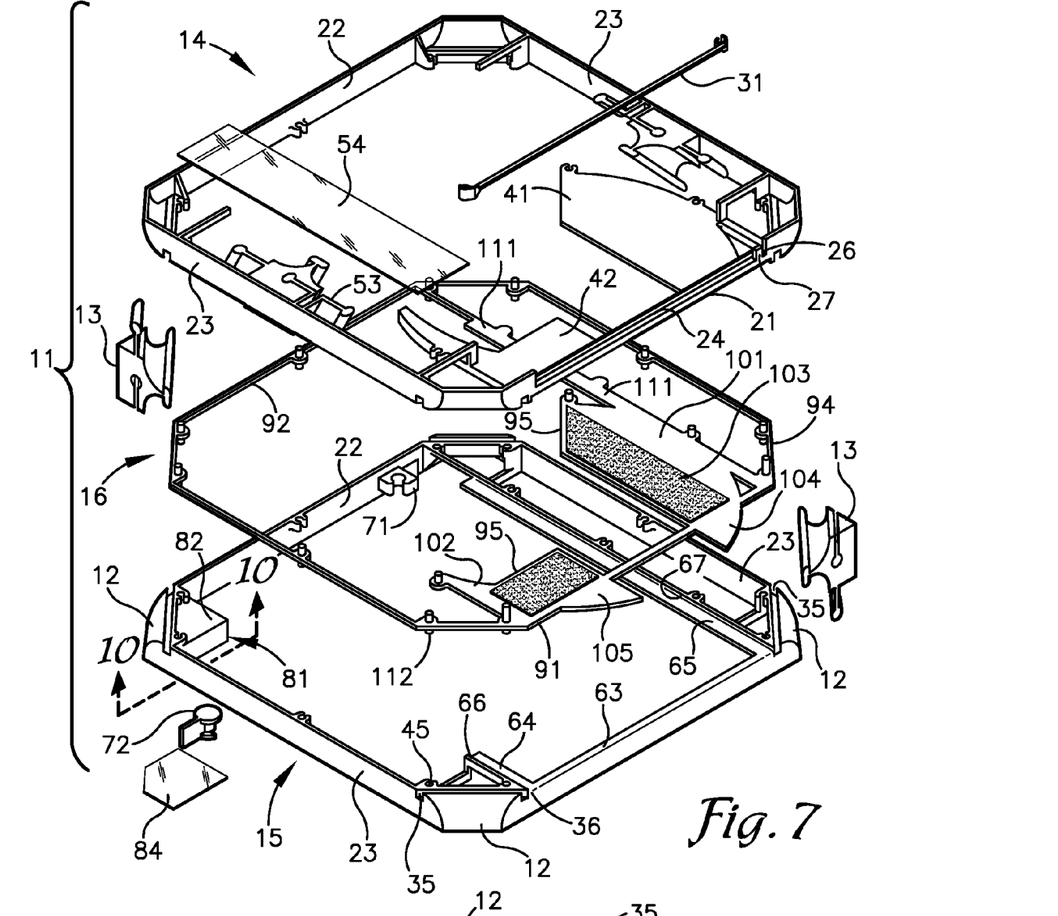
FIG. 7 is an exploded perspective view of a digital video disc and booklet holder unit with the disc and booklet entry on the same side of the unit, similar to the compact disc holder of FIG. 1, but with the middle and bottom sections elongated to support a longer booklet.

As best shown in FIG. 11, the upper margin of the access wall 21 is stepped inwardly to form a slot 24 for receiving a label 25 (FIG. 12). As shown in FIGS. 1, 11 and 12, the slot 24 stops short of each corner 12, leaving a portion of the wall 21, which at one end includes a generally vertical kerf or notch 26 defining a tab 27 for threading and retaining the label 25 (FIGS. 1, 7, 12). An elongated label rail 31 (FIG. 11) is sized to form the top portion of the label slot 24. The lower surface of the label rail 31 includes a groove 32 for receiving the upper margin of the label 25 (FIGS. 2, 6, 12). Each end of the rail 31 is formed into a generally hooked shape having an aperture 33 (FIGS. 5, 11) for joining the label rail 31 to the label slot 24 as will be described.

The lower margin of the access wall 21 includes a detent or slot 34 (FIG. 5) for receiving a disc 3. The detent 34 stops short of each corner 12, leaving a portion of the wall 21 adjacent each of the two corners 12. Each corner 12 includes a groove or slot 35 (FIG. 1) that extends along the inner hypotenuse and opens into the respective wall 21, 22, or 23. Where the slot 35 opens into the access wall 21, together with the detent 34, it defines a tab or foot portion 36 of the access wall 21.

As shown in FIG. 1, first and second disc support plates 41 and 42 extend inwardly from the access wall 21 to the interior of the element 14. The first support plate 41 is generally elongated and extends substantially into the interior of the holder element 14, while the second support plate 42 is generally shorter. The outer holder element 14 may be constructed with the first support plate 41 on the right and the second support plate 42 on the left when viewed from above as depicted in the drawing figures. It is also foreseen that the position of the plates 41 and 42 may be reversed or that they may be of identical construction.

A pair of built up edges or disc rails 43 and 44 (FIG. 12) extend inwardly from the feet 36 along the lateral sides of the plates 41 and 42 to cooperatively form a stop for the disc 3. The rail 44 extends inwardly for a distance beyond the shorter second disc support plate 42. The disc rails 43 and 44 each include apertures 45, which are also provided at spaced intervals along the walls 21-23 of both the first and second outer holder elements 14 and 15 in a pattern for receiving a pattern of corresponding pegs as will be described. The inwardly facing surface of each of the illustrated disc support plates 41 and 42 includes a cleaning pad 46 (FIGS. 5, 6, 12), sized and shaped to conform to the surface of the respective plate. The pads 46 are constructed of a material such as a napped, microfiber or other fabric having a high coefficient of friction in sliding contact with the surface of a disc 3, and are adhered to their respective disc support plates for cleaning discs 3 as they are inserted into and removed from a holder unit 11.

A generally L-shaped floating rear rail 51 (FIG. 1) is connected to each of the sidewalls 23, and is oriented so that the longer leg projects laterally inwardly in a plane with the upper margin of the sidewall 23 and toward the interior of the holder element 14. The rear rails 51 are positioned near the rear corners 12 of the holder element, in generally parallel spaced relation to the end wall 22. A generally L-shaped front rail support 52 is interconnected between each of the sidewalls 23 and the rear surface of the respective disc rails 43 or 44, with the shorter leg contacting the edge stop for supporting the longer leg, which in turn is connected to and in a plane with the upper margin of the sidewall 23 (as viewed in FIGS. 1 and 11). The front rails 52 are positioned near the front corners 12 of the holder element 14, in generally spaced relation to the access wall 21. In this manner the front and real support rail pairs 51 and 52 provide interior support and stiffening to the assembled holder units 11.

An approximately T-shaped storage support 53 is connected to each of the sidewalls 23, for holding and storing a pair of corner connectors 13 when they are not in use. A removable film cover 54 (FIG. 1) covers the connectors 13, holding them in place and preventing them from falling out in case the unit 11 is inverted. The cover 54 is generally rectangular in shape, of transparent or translucent synthetic resin construction and is sized to extend across and between the outer surfaces of the front and rear rails 51 and 52.

As best shown in FIGS. 12 and 13, the first outer holder element 14 may be constructed to have storage supports 53 positioned on one sidewall 23 and the end wall 22 where the first and second holder elements 14 and 15 are to be assembled with the access walls 21 in 90° offset relation. In such construction, the end wall 22 includes a pair of end wall rails 55, similar to the rear rails 51 but extending forwardly from the end wall 22. One of the rear rails 51 is omitted, and the remaining rail is joined to the respective end wall rail 55. A generally L-shaped film cover 56 is provided, having equal legs sized to extend across the outer surface of the rear and end wall rails 51 and 55.

As best shown in FIGS. 1 and 2, the content-facing margin of one of the sidewalls 23 may also be stepped inwardly to form a label slot 61 for receiving a label 25. As shown in FIG. 6, the sidewalls 23 of both the first and second outer holder elements 14 and 15 may be stepped in this manner to form a slot 61. When a unit 11 with such slots 61 is assembled, the adjacent slots 61 merge to form a single, much wider slot 61 that is suitable for receiving a user-inscribed label.

Each end wall 22, as well as the sidewalls 23, includes apertured, peg-receiving structures 45 (FIG. 1) as on the disc rails 43 and 44. These apertures are positioned adjacent each of the corners 12 as well as generally midway along the respective walls 22 and 23.

The second outer holder element 15 is configured to support a booklet, such as a CD booklet 4 (FIG. 4), DVD booklet 5 (FIG. 9) or other printed content member such as a card 6 (FIGS. 2, 3). As best shown in FIGS. 1 and 7, the element 15 has the same footprint as the first outer holder element 14, including an access wall 21 and end wall 22, a pair of side walls 23, and chopped corners 12 with slots 35. The content-facing side of the access wall 21 includes an elongated detent 63 that forms an entry slot for a printed content member. The detent 63 stops short of each corner 12, leaving a portion of the wall 21 adjacent each of the two corners 12, which, together with the slot 35 defines a foot 36. First (depicted on the left in FIG. 1) and second (depicted on the right in FIG. 1) retainer rails 64 and 65 for a booklet 4 or 5, card 6 or the like, extend inwardly in a plane with the detent 63 for supporting a booklet or other printed content member. The lateral margin of the shorter first booklet retainer rail 64 is built up to form a first lip or edge 66 that functions as a stop, and the lateral margin of the longer second retainer rail 65 is also built up to form a corresponding second lip or edge stop 67 in parallel spaced relation to the first edge stop 66. The inward end of the longer rail 65 may also be built up to form an end stop 68, for retaining a booklet or card, 4, 5, or 6 in place so that it does not slide into the unit 11 beyond the access wall 21 and the reach of a user.

Figure 8:
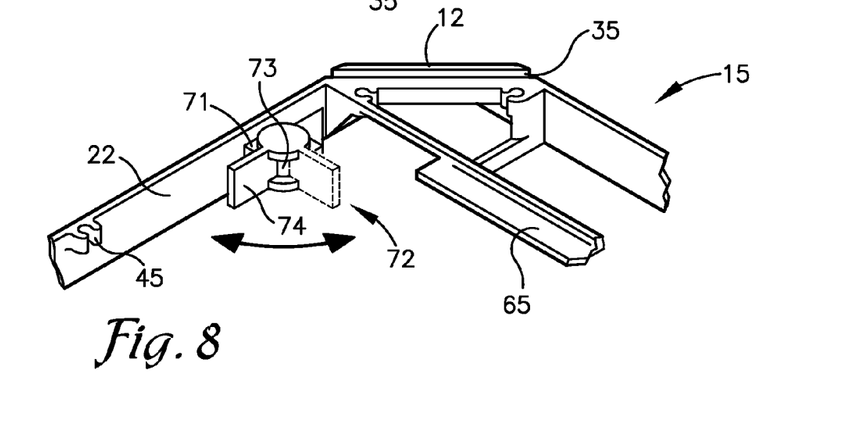
FIG. 8 is an enlarged fragmentary perspective view of a bottom corner of the holder unit shown in FIG. 7 and showing details of an optional rotatable booklet stop.

The end wall 22 of the second outer holder element 15 may also be constructed to include an apertured stop-receiving structure 71 similar to the peg receiving hole structures 45, but of more substantial construction for receiving and supporting a rotatable stop 72 (FIGS. 7, 8). The stop 72 includes a pivot pin or pintle 73 connected to a laterally extending wing 74, that can be shifted or rotated as shown in FIG. 8 between a first, inwardly extended position to a second retracted position adjacent the end wall 22. The wing structure 74 is sized for contact with the top margin of a generally rectangular shaped DVD booklet 5 when the booklet is inserted into the holder unit 11 through the access wall 21. In this manner, the rotatable stop 72 serves to prevent insertion of a DVD booklet 5 too far into the unit 11, so that it cannot be grasped and removed by a user. When an especially long booklet 5 is to be inserted into the unit 11, the wing structure 74 may be rotated back, out of the content-receiving area of the holder element 15 and into the second retracted position in spaced relation to the end wall 22.

A corner storage box 81 is provided for holding the stop 72 when it is not in use (FIGS. 7, 9, 10, 13). The box 81 is generally triangular overall in shape, for nesting against one of the chopped corners 12. It has a closed top 82 (FIG. 10) facing the interior of the unit 11 and an open bottom for receiving the stop 72. The interior surface of the top is equipped with an aperture 83 for receiving the stop pintle 73. The bottom of the box 81 is open and a film cover 84 (FIGS. 7, 13) is provided for holding the stop 72 in place within the box 81.

The inner holder element or frame member 16 is sandwiched between and interconnects the first and second outer elements 14 and 15. It shares the same perimeter footprint as the elements 14 and 15. The inner element 16 has a generally open framework including first and second surfaces or sides 85 and 86. It has an access divider rail 91, an end divider rail 92, a pair of side divider rails 93, and chopped corner divider rails 94. The inner element 16 is of generally lighter construction than the outer elements 14 and 15 because the rails 91-94 are generally thinner and need not form upstanding walls as do the corresponding elements of the inner and outer elements 14 and 15. As shown in FIGS. 4, 5, 12, and 13 where the unit 11 is configured to receive recorded media in a 90° or 180° offset arrangement, the inner element 16 may be configured to substitute a second access divider rail 91 for either the end divider rail 92 or one of the side divider rails 93.

As exemplified in FIGS. 12 and 13, the inner element 16 includes a first support element set or elements 95 on its first side 85 and may include a second support element set or elements 96 on its second side 86, each of which is configured particularly to cooperate with the first outer holder element 14 to receive and support a respective first and second recorded media component 2.

The first support elements 95 include first and second disc support plates 101 and 102 extending inwardly from the access rail 91 toward the end rail 92. The first support plate 101 is generally configured to conform to the elongated shape of the first disc support plate 41 of the first outer holder element 14, and the second support plate 102 is generally configured to conform to the more rectangular shape of the second disc support plate 42 of the first element 14. If necessary, the inner element 16 may be flipped over to reverse the positions of plates 101 and 102 to conform with the respective plates 41 and 42 of the first element 14. It is also foreseen that the support plates 101 and 102 could be similarly shaped.

Cleaning pads 103, similar to pads 46, are adhered to one or both side surface 85 and 86 and are sized and shaped to conform to the surfaces of the plates 101 and 102. The disc support plates 101 and 102 each include a respective outward extension or guard tab 104 and 105 with a finger notch 106 therebetween. The outer perimeter of the tabs 104 and 105 define a circle of approximately the same radius as the disc 3.

Figure 14:
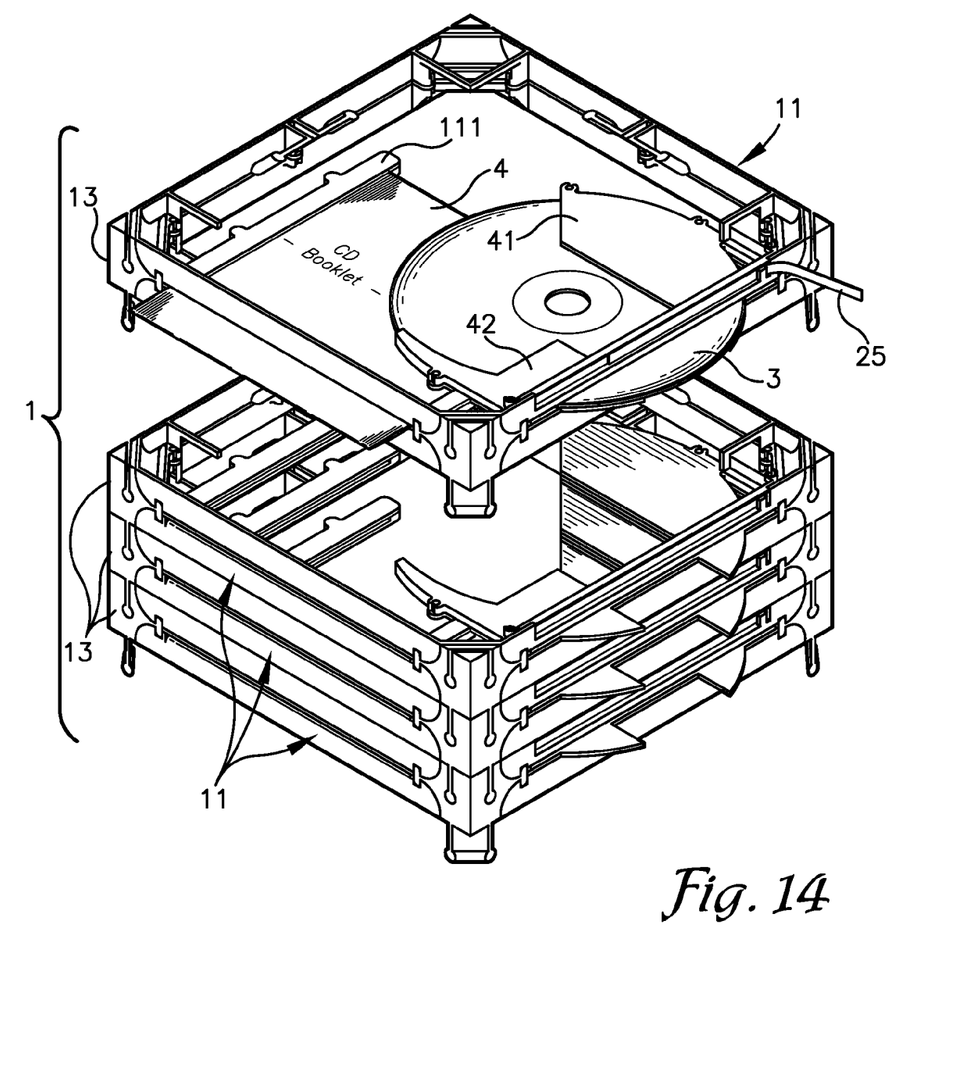
FIG. 14 is a perspective view of an assembly of compact disc and booklet holder units with the disc and booklet entries positioned in 90° offset relation and the units assembled in alignment.

The second support elements 96 may be configured as shown in FIGS. 5 and 12 to include structure identical to the first elements 95 to cooperate with the second outer holder element 15 to receive and support a second disc 3. In that event, the disc plates 101 and 102 would be reversed and the cleaning pads 103 oriented to face the second side 86. The second elements 96 may also be configured as shown in FIGS. 4, 9, and 14 to include structure configured to cooperate with the booklet retainer rails 64 and 65 to receive and support a booklet 4 or 5, card 6 or the like. In that case, the elements 96 include a generally planar retainer rail plate 111 which forms a top plate for the booklet retainer rail 65. The reverse surface of the shorter second disc plate 102 forms a top plate for the shorter second booklet retainer rail 65. Where, as shown in FIG. 1, a disc and generally shorter CD booklet 4 are to be accessed from the same side of the unit 11, the reverse surface of both disc plates 101 and 102 form top plates for the booklet retainer rails 64 and 65, obviating the need for the retainer rail plate 111. But where, as shown in FIG. 9, a disc 3 and generally longer DVD booklet 5 are to be accessed from the same side of the unit, the retainer rail plate 111 may be included. In a holder unit 11 in which the disc 3 and booklet 4 or 5 are inserted on the same side, as in FIGS. 1 and 7, the rail plate 111 may be formed as an integral part of or as an extension of the disc support plate 101.

The rails 91-94, disc plates 101 and 102, and retainer rail plate 111 of the inner element 16 are equipped with a plurality of spaced pegs 112 arranged in a corresponding pattern for reception within the pattern of holes 45 previously described in the first and second outer elements 14 and 15.

The corner connectors 13 (FIG. 1) have a generally triangular prismatic overall configuration and are similar to those described in U.S. Pat. No. 6,188,032 B1, which is incorporated herein by reference. Each connector includes a first or lateral tongue 113 having a generally T-shaped cross section. The lateral tongue 113 extends toward the unit 11 for mating engagement with the corner slots 35 of the outer elements 14 and 15. Each connector 13 also includes a second or transverse tongue 114 that projects from the connector 13 along an axis generally transverse to the lateral tongue 113. The second tongue 114 is configured with a raised bead along its outer edge. The upper surface of each connector 13 includes a keyhole slot or groove 115, also generally transverse to the lateral tongue 113 and opposite the second tongue 114. The groove 115 is configured for reception of the second tongue 114 projecting from an immediately adjacent connector 13.

Figure 15:
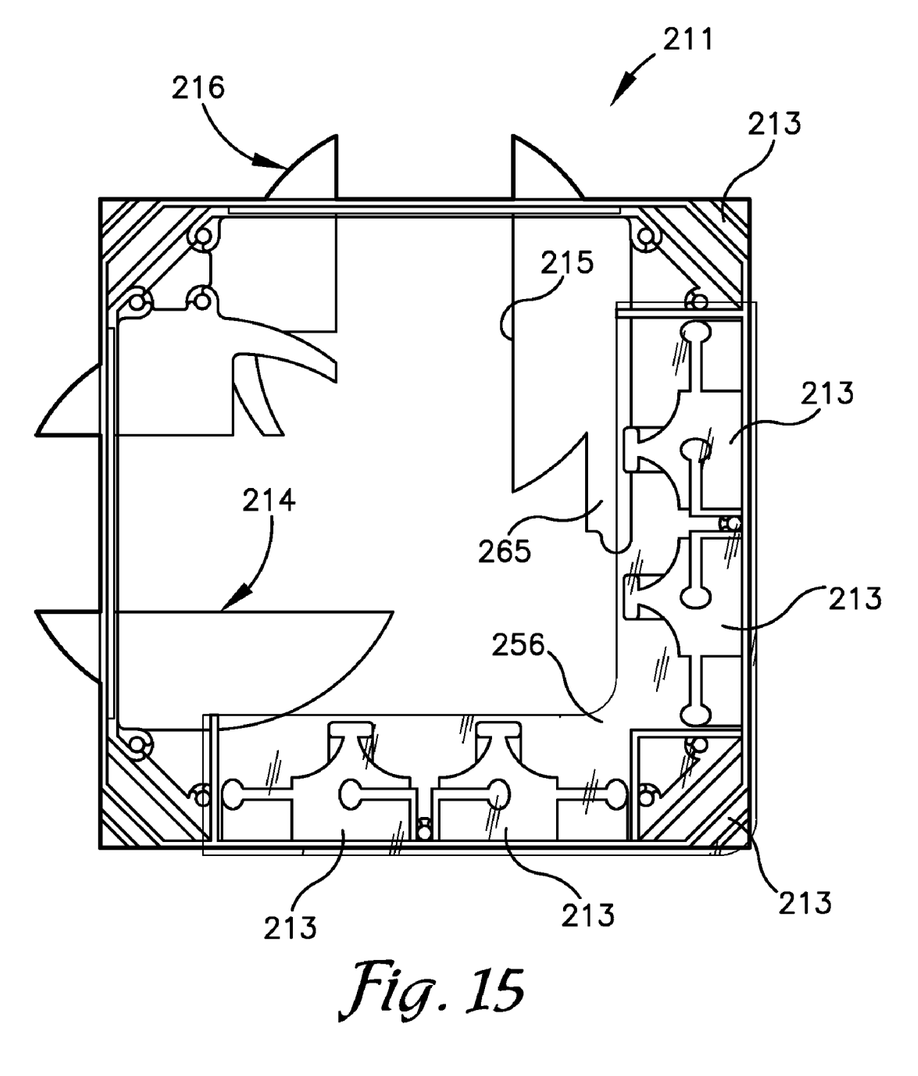
FIG. 15 is a top plan cross sectional view of a mini CD holder unit for storing two mini CDs with the disc entries positioned in 90° offset relation and having similarities with the disc holder unit shown in FIG. 12.

FIG. 15 depicts a modified embodiment of a modular holder unit 211. This unit 211 is configured for storing two discs like the unit depicted in FIG. 12, except that it is adapted for storing miniature compact discs or mini CDs, sometimes referred to as "minidiscs", that is discs having a diameter of about 3⅛" or 80 mm. The holder 211 is depicted having the disc entries positioned in 90° offset relation, without booklets. Those skilled in the art will appreciate that the unit 211 may also be configured to hold a disc and a booklet, a pair of booklets in aligned position or in 180° offset relation as previously described. The unit 211 is similar in construction to the modular holder unit 11 previously described, having a first outer holder element 214, a second outer holder element 215 and an inner holder element 216. The unit 211 is shown assembled, with corner connectors 213 installed at each corner as well as in storage on the inner sidewalls of the first outer holder element 214 and covered with an L-shaped film cover 256. The second outer holder element is similar to the first outer holder element 214 and is configured for supporting a disc (not shown) but is depicted to include a booklet support rail 265 for holding in place a booklet (not shown) or other printed material.

As shown in FIG. 2, a single modular unit 11 is constructed by interconnecting the first and second outer elements 14 and 15 by engagement of the pegs 112 of the inner element 16 within the apertures 45 of the outer elements 14 and 15. The respective corner slots 35 are thereby aligned to cooperatively form four double corner slots 35 slots, each sized for reception of a corner connector first or lateral tongue 113. The pegs 112 and apertures 45, corner slots 35 and lateral tongues 113 thus cooperate to connect the outer elements 14 and 15 to form a modular holder unit 11 and to hold the unit together. In such a single unit 11, when the transverse second tongues 114 of the four corner connectors 13 are in dependent relation, they may serve as support feet for the unit. When thus assembled into a modular unit 11, the access wall 21 of the first outer element 14 and an access rail 91 of the inner element 16 cooperatively form a first opening 121 into a content receiving chamber for receiving a recorded media component 2. Similarly, the access wall 21 of the second outer element 15 and an access rail 91 of the inner element 16 cooperatively form a second opening 122 for receiving a second recorded media component 2 into a second content receiving chamber.

In use, a user selects first and second outer elements 14 and 15 that will enable storage of a disc and printed matter (FIGS. 1, 2, 3, 4, 7, 9, 13, 14), a pair of discs (FIGS. 5, 6, 12, 15) or a pair of printed elements 4, 5, or 6 (not shown) as desired. The user next selects an inner element 16 for connection of the outer and inner elements 14 and 15 with first and second openings 121 and 122 in alignment (FIGS. 1, 2, 3, 6, 7, 9), in 90° offset alignment (FIGS. 12, 13, 14, 15) or in 180° offset alignment (FIGS. 4, 5). The user orients the preselected outer element 14 with the preselected inner element 16 to achieve the desired orientation, aligns the apertures 45 with the pegs 112, and snaps the elements 14 and 16 together. The elements 14 and 16 may be held together by friction, glue or other means such as by sonic welding.

The user next removes the film cover 54 from each pair of corner connector storage supports of an outer element 14 or 15 and removes four corner connectors 13 from the supports 53. The user aligns the lateral tongues 113 of a corner connector 13 with each of the four corner grooves 35 of the first outer element 14, orients the preselected second outer element 15 to achieve the desired offset, aligns the corner grooves 35 of the second outer element 15 with the lateral tongues 113 and the apertures 45 with the pegs 112, and snaps the second outer element 15 and the inner element 16 together. Because the corner unit connectors 13 are reversible, the longitudinal tongue 114 may be positioned to project toward the second outer element 15 or backward from the first outer element 14 for connection with a second modular unit 11.

A second modular unit 11 may be coupled with the first unit 11 by aligning the units in a preselected orientation and snapping the longitudinal tongues 114 into the corresponding keyhole grooves 115 of the adjacent unit 11. It is foreseen that an assembly kit (not shown) may include a pair of closed covers (not shown) having the same overall footprint as the outer holder elements 14 and 15 for installation in covering relation over the exposed skeletal ends of the assembly 1.

Advantageously, with a limited number of parts, a user can assemble a wide variety of modules 11 in a variety of orientations. For example, the units 11 may be connected so that a unit for storing a DVD with a recorded movie is directly connected to a unit containing a CD with the recorded sound track from that movie. Each unit 11 may be configured to accommodate two different size booklets, as, for example, a CD booklet 4 and a longer DVD booklet 5.

Because each unit 11 is of generally skeletal, open-ended construction, they are economical in their use of materials and cost-effective to construct. The units 11 may be stacked vertically or laterally. Each unit 11 may be selectively configured so that the openings 121 and 122 are aligned or offset 90° or 180°, and the units 11 themselves may be configured in aligned (FIGS. 2, 4, 9, 14) or 90° (FIG. 3) or 180° (not shown) offset relation when they are interconnected. They may also be connected in any combination of the foregoing alignments to form an assembly 1 having convenient access to a user. Thus, the first opening 121 may be optimally placed with respect to the second opening 122 in the unit 11 as well as the openings 121 and 122 in adjacent units to make it easier to grasp and remove the discs 3 and printed materials 4-6 contained therein. Each modular unit 11 as well as the entire container assembly 1 may be repeatedly broken down and reconfigured by the user to reflect changes in personal preference, in the makeup of the stored collection, or of the location in which the unit is stored. For example, the collection may be stored with all of the CDs 3 and associated booklets 4 at one end, and all of the DVDs 3 and associated booklets 5 at the other end. Or, the entire collection can be organized alphabetically, without regard to type of disc 3. Each disc 3 may be stored with its associated liner notes 4-6, or the discs may be grouped and the notes grouped. The unit openings 121 and 122 may be aligned in adjacent relation, or they may be offset 90° or 180° to facilitate removal. And the modular assembly 1 may be stored in a line, such as on a shelf, or it may be stored vertically, such as against a wall or in a corner. End pieces (not shown) may be provided to enclose the ends or top and bottom of the assembly 1.

It is to be understood that while certain forms of the present invention have been illustrated and described herein, it is not to be limited to the specific forms or arrangement of parts described and shown.

What is claimed and desired to secure by Letters Patent:

1. A modular holder unit for recorded media components for assembling a plurality of modular holder units into a composite media holder assembly, each modular holder unit comprising:
 (a) a first outer holder element configured to receive a first recorded media component;
 (b) a second outer holder element configured to receive a second recorded media component;
 (c) an inner holder member having a first side cooperating with said first outer holder element to receive and support said first media component and an opposite second side cooperating with said second outer holder element to receive and support said second media component; and (d) said inner holder member being affixed to said first holder element on said first side and said second holder element on said second side to form said modular holder unit;

(e) said first and second outer holder elements each further including an access wall, a pair of side walls and an end wall;

(f) each of said access walls including an elongated slot and a removable label rail for surmounting said slot; and (g) said slot and said label rail cooperatively receiving and retaining in place a label member.

2. A unit as set forth in claim 1 wherein:
(a) said first and second recorded media components are selected from the group consisting of a compact disc, a video disc, a booklet and a card.

3. A unit as set forth in claim 1 and including:
(a) a unit connector for connecting one of said modular holder units in adjacent relation with another of said modular holder units.

4. A unit as set forth in claim 1 and including:
(a) a plurality of unit connectors for connecting a plurality of said modular holder units in adjacent relation with one another to form said composite media holder assembly.

5. A unit as set forth in claim 1 wherein:
(a) one of said first and second outer holder elements including a movable stop; and
(b) said stop is shiftable between a first extended position for holding in place a booklet and a second retracted position for holding in place an elongated booklet.

6. A unit as set forth in claim 1 wherein:
(a) said inner holder member includes a first element on said first side configured particularly to cooperate with said first outer holder element to receive and support said first recorded media component; and
(b) said inner holder member includes a second element on said second side configured particularly to cooperate with said second outer holder element to receive and support said second recorded media component.

7. A unit as set forth in claim 1 wherein:
(a) at least one of said inner holder member first and second sides further includes a cleaner member for contacting and cleaning a disc.

8. A unit as set forth in claim 1 wherein:
(a) said inner holder member is configured on said first side in cooperation with said first outer holder element to form a first opening for receiving said first media component; and
(b) said inner holder member is configured on said second side in cooperation with said second outer holder element to form a second opening for receiving said second media component.

9. A unit as set forth in claim 8 wherein:
(a) said first and second openings are positioned in angularly aligned spaced adjacent relation.

10. A unit as set forth in claim 8 wherein:
(a) said first and second openings are positioned in a substantially 90° angular offset relation.

11. A unit as set forth in claim 7 wherein:
(a) said first and second openings are positioned in a substantially 180° angular offset relation.

12. A modular holder unit for recorded media components for assembling a plurality of modular holder units into a composite media holder assembly, each modular holder unit comprising:
(a) a first outer holder element configured to receive a first recorded media component;
(b) a second outer holder element configured to receive a second recorded media component;
(c) an inner holder member having a first side cooperating with said first outer holder element to receive and support said first media component and an opposite second side cooperating with said second outer holder element to receive and support said second media component; and
(d) said inner holder member being affixed to said first holder element on said first side and said second holder element on said second side to form said modular holder unit; and
(e) at least one of said first and second outer holder elements includes a pair of spaced apart outer disc support plates;
(f) each of said disc support plates further includes a first disc rail and a second disc rail;
(g) said inner holder member including a pair of corresponding inner disc support plates; and
(h) said first and second disc rails and said outer and inner disc support plates are configured for cooperatively receiving a disc and holding it in place within said unit.

13. A unit as set forth in claim 12 wherein:
(a) one of said first and second outer holder elements includes a pair of spaced apart booklet retainer rails;
(b) said one of said first and second outer holder elements further includes a movable stop shiftable between a first extended position for holding in place a booklet and a second retracted position for holding in place an elongated booklet; and
(c) said booklet retainer rails, said inner disc support plates and said stop are configured for cooperatively receiving a booklet and holding it in place.

14. A unit as set forth in claim 13 wherein:
(a) one of said first and second recorded media components is a booklet; and
(b) one of said first and second recorded media components is an optical disc.

15. A modular holder unit for recorded media components for assembling a plurality of modular holder units into a composite media holder assembly, each modular holder unit comprising:
(a) a first outer holder element configured to receive a first recorded media component;
(b) a second outer holder element configured to receive a second recorded media component;
(c) an inner holder member having a first side configured to receive said first media component in cooperation with said first outer holder element and an opposite second side configured to receive said second media component in cooperation with said second outer holder element;
(d) said inner holder member being affixed to said first holder element on said first side and said second holder element on said second side to form said modular holder unit;
(e) said inner holder member is affixed on said first side to said first outer holder element to form a first opening for receiving said first media component; and
(f) said inner holder member is affixed on said second side to said second outer holder element to form a second opening for receiving said second media component;

(g) at least one of said first and second outer holder elements includes a pair of spaced apart disc support plates;
(h) each of said disc support plates further includes a first disc rail and a second disc rail;
(i) said inner holder member includes a pair of corresponding inner disc support plates;
(j) said first and second disc rails and said outer and inner disc support plates are configured for cooperatively receiving a disc and holding it in place within said unit;
(k) one of said first and second outer holder elements includes a pair of spaced apart booklet retainer rails;
(l) one of said first and second outer holder elements includes a movable stop shiftable between a first extended position for holding in place a printed element and a second retracted position for holding in place an elongated printed element; and
(m) said booklet retainer rails, said inner disc support plates and said stop are configured for cooperatively receiving a booklet and holding it in place.

16. A unit as set forth in claim 15 wherein:
(a) said first and second openings are positioned in angularly aligned spaced adjacent relation.

17. A unit as set forth in claim 15 wherein:
(a) said first and second openings are positioned in a substantially 90° angular offset relation.

18. A unit as set forth in claim 15 wherein:
(a) said first and second openings are positioned in a substantially 180° angular offset relation.

19. A unit as set forth in claim 15 including:
(a) said modular unit having a plurality of corners;
(b) a plurality of unit connectors for connecting a plurality of said modular holder units in adjacent relation with one another to form said composite media holder assembly;
(c) one of said first and second outer holder elements including a movable stop;
(d) said stop is shiftable between a first extended position for holding in place a booklet and a second retracted position for holding in place an elongated booklet; and
(e) one of said corners includes a storage box member for storing said stop.

* * * * *